A. C. RICHARDSON.
PROCESSING APPARATUS FOR CANNED PRODUCTS.
APPLICATION FILED AUG. 27, 1919.

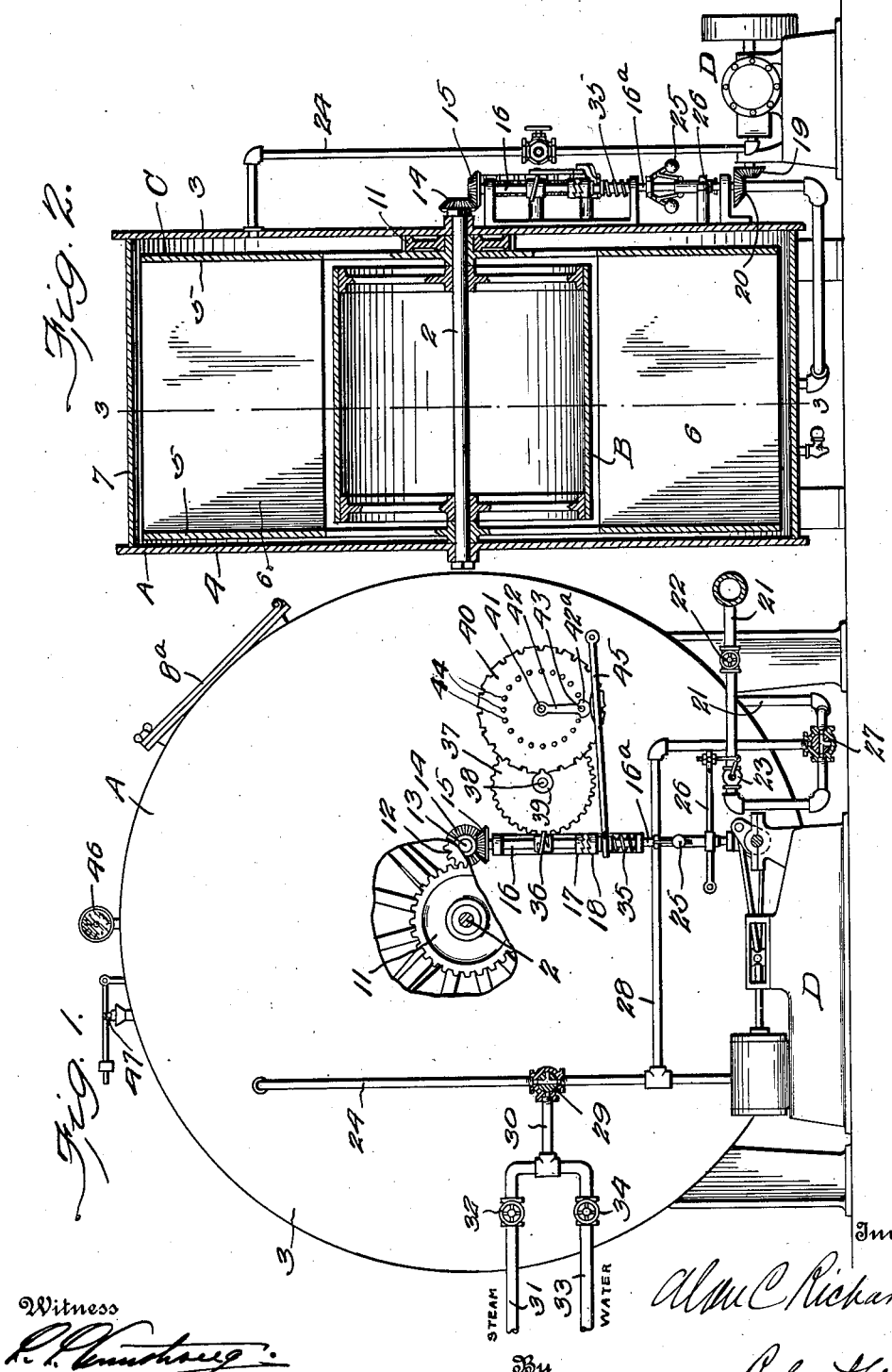

1,328,202.

Patented Jan. 13, 1920.
2 SHEETS—SHEET 2.

UNITED STATES PATENT OFFICE.

ALAN C. RICHARDSON, OF SILVER SPRING, MARYLAND.

PROCESSING APPARATUS FOR CANNED PRODUCTS.

1,328,202. Specification of Letters Patent. Patented Jan. 13, 1920.

Application filed August 27, 1919. Serial No. 320,269.

*To all whom it may concern:*

Be it known that I, ALAN C. RICHARDSON, a citizen of the United States, residing at Silver Spring, in the county of Montgomery and State of Maryland, have invented certain new and useful Improvements in Processing Apparatus for Canned Products, of which the following is a specification.

In processing canned goods in steam heated retorts, it has been found desirable to roll or move the cans to agitate their contents for the purpose of accelerating the distribution of heat throughout their contents. The processing temperature maintained in the retort is generally the highest temperature which the can contents will stand without injury from the heat, and this temperature is maintained practically constant in the retort throughout the processing operation. It is possible to shorten the time of processing the can contents by raising the temperature in the retort above the normal processing temperature for a short period of time, at the commencement of the operation, while the can contents are being heated to the normal processing temperature. Thus, at the commencement of the operation, if the can contents are agitated so that the heat will be conducted quickly away from the walls of the can and distributed throughout the mass, the temperature in the retort may be raised above the normal processing temperature until the can contents have been heated throughout to the latter temperature. After the can contents have been heated to the processing temperature, a continuation of the higher temperature in the retort would injuriously affect the contents. Therefore, during the remainder of the processing operation, the temperature in the retort must be reduced to the normal processing temperature.

In carrying out my invention, I have provided means for agitating the filled cans in a closed retort and means for maintaining a temperature above the normal processing temperature for a predetermined time, sufficient to heat the can contents throughout to the processing temperature, after which the agitation of the cans is stopped and the temperature in the retort is reduced to the normal processing temperature and this is continued until the operation has been completed. As a means for moving the cans to agitate their contents, I provide a small self-regulating steam engine for each retort and this engine may be employed to regulate the pressure and temperature within the retort so as to maintain a relatively high temperature in the retort while the can contents are being heated to the processing temperature, and to maintain a relatively lower temperature in the retort thereafter until the processing has been completed. Also, as it is unnecessary to agitate the cans after the contents have become heated to the normal processing temperature, I have provided means for stopping the agitation simultaneously with the reduction in temperature in the retort.

In order to utilize the engine for these purposes, the steam supply pipe is connected to the retort and the engine receives its supply of steam from the retort. A speed governor on the engine controls a throttle valve in the steam supply pipe and hence controls the admission of steam to the retort and to the engine. With this arrangement, a load which tends to slow down the speed of the engine will cause an adjustment of the throttle valve and an increase in the pressure within the retort and in the engine cylinder, and a decrease in the load will have the reverse effect, reducing the pressure in the retort and the engine cylinder. The retort contains a can carrier operated by the engine and this carrier, filled with cans, constitutes a load on the engine which operates to maintain a relatively high pressure, and temperature, in the retort, at the commencement of the processing operation. After a predetermined time, sufficient to allow the can contents to be heated throughout to the normal processing temperature, the can carrier is automatically stopped, thus throwing the load off of the engine, and the governor of the latter immediately operates to reduce the steam pressure within the retort and in the engine cylinder, which receives its supply from the retort. The temperature in the retort is thus reduced, and as long as the engine operates idly this reduced temperature will be maintained. After this lower temperature has been maintained for a sufficient time to complete the processing, the steam is cut off and cold water is admitted to cool the cans and their contents. The invention also involves improvements in the cooker and in details which will be clear from the following specification taken in connection with the accompanying drawing, in which:

Figure 1 is an end elevation of a rotating cooker made in accordance with my improvements and showing the means for operating the same and automatically controlling the temperature;

Fig. 2 is a central, vertical section through the same, taking on the line of the retort shaft; and, Fig. 3 is a section on the line 3—3 of Fig. 2.

Figure 3:
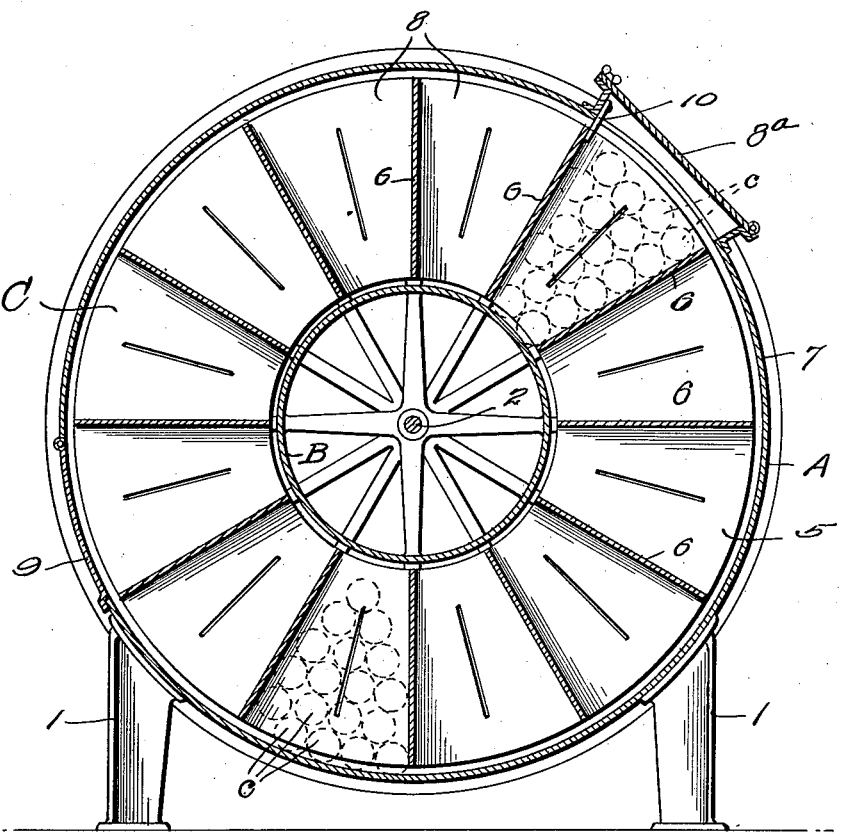

Referring to the drawings, A indicates a retort, which is in the form of a drum, carried by suitable supports 1. Within the retort is a small cylinder or drum B, which is secured to a fixed shaft 2, the latter passing centrally through the retort, and secured at its ends to the side walls 3 and 4 of the retort. A can carrier C is arranged within the retort and comprises two disks or spiders 5, which are journaled upon the fixed shaft 2 between the ends of the drum B and the side walls of the retort. A series of partitions 6, arranged radially to the axis of the retort and equally spaced apart, extend between the spiders 5 in the space between the cylinders B and the peripheral wall 7 of the retort. These partitions are secured to the spiders 5 and divide the space between the cylinder B and the peripheral wall of the retort into a series of pockets 8, for receiving the cans. As clearly shown in Fig. 3, the drum B forms an inner stationary end for each of the pockets and the wall 7 of the retort forms an outer stationary end for each of the pockets. The retort is provided with a hinged door or cover 8ᵃ in its upper part which may be opened to admit cans (indicated in dotted lines at c) to the pockets, and it is also provided with a door 9 in its lower half which may be opened to permit cans to roll out. When the carrier is being loaded with cans, it may be held against rotation, in any desired position, by moving a latch 10 into position to engage one of the partitions adjacent to door 8ᵃ. Any other suitable means may be employed for holding the carrier while the cans are being loaded into or unloaded from the pockets.

It will be evident that when the pockets are filled with cans and the carrier is rotated, the cans in the inner ends of the pockets above the axis of the machine will be frictionally rotated by their engagement with the drum B, and that when the pockets pass the horizontal line, the cans will drop to the larger ends of the pockets and the outermost cans will roll against the cylindrical wall of the retort. The rolling motion imparted to the cans directly in engagement with the inner drum or the peripheral wall of the retort, will impart a rolling motion to the rest of the cans in the pocket. Thus, during each revolution of the can carrier, the contents of the cans will be agitated both by the rolling motion and by the movement of the cans as they drop inwardly and outwardly in the pockets.

The carrier is provided with a gear 11, which engages a pinion 12, on a short shaft 13, which extends through the wall 3 of the retort, and this shaft carries a bevel gear 14, which meshes with a similar gear 15, on a vertically arranged shaft 16. This latter shaft carries a clutch member 17, adapted to be engaged by a complementary clutch member 18, upon a drive shaft 16ᵃ, which is geared to a steam engine D. As shown, the engine shaft is provided with a bevel gear 19, which engages a similar gear 20, on the drive shaft. The engine is preferably a small engine having a relatively high speed. The steam for operating the engine is delivered through a pipe 21, in which is arranged a hand valve 22 and a throttle valve 23. From the throttle valve, this pipe leads into the lower part of the retort, and an exhaust pipe 24 leads from the upper part of the retort to the steam chest of the engine D. The throttle valve is controlled by a governor 25, on the shaft 16ᵃ, which raises and lowers a lever 26, adjustably connected to the stem of the throttle valve. Thus, in the system of piping just described, the retort is interposed between the throttle valve and the engine cylinder, and the admission of steam to the retort and to the engine cylinder is controlled by the engine governor and the throttle valve.

For the purpose of admitting steam directly to the engine cylinder when desired, without passing through the retort, a three-way valve 27 is arranged in the pipe 21, between the throttle valve and the retort, and a pipe 28 leads from said valve to the pipe 24. By setting the valve in one position, steam will pass through the throttle valve and then directly to the retort, and by setting said valve in another position, steam will be cut off from the retort and directed through the pipes 28 and 24 to the engine cylinder. In the pipe 24, between its connection with the pipe 28 and the outlet from the retort, is arranged a three-way valve 29, which can be set in one position to admit steam from the retort directly to the engine, and in another position to cut off the steam from the engine and connect the upper portion of the pipe 24 with a pipe 30. A pipe 31, leading from the boiler, is connected to the pipe 30 through a hand valve 32, and a pipe 33, connected to a source of cold water, leads through a hand valve 34 to the pipe 30. By setting the valve 29 so as to connect the pipe 30 with the upper portion of the pipe 24 and to close off the lower part of said latter pipe, live steam, or cold water, can be delivered through the upper portion of the pipe 24 into the retort, when desired; or by setting the valve 29 in another position, the pipe 30 will be cut off and communication will be established through the pipe 24 from the retort to the engine cylinder. It will be understood that when valve 27 is set to admit steam into the engine cylinder without passing through the retort, the valve 29 will be set so as to close off the lower part of the pipe 24, and in this position it will connect the pipe 30 with the upper portion of the pipe 24.

The clutch member 18 is constantly pressed toward the member 17 by a spring 35, and when said members are engaged and the engine is in operation, the can carrier will be rotated at a practically constant speed. I have provided means for dis-engaging the clutch after the can carrier has been rotated for a pre-determined number of revolutions, or, in other words, after a pre-determined lapse of time, since the speed is constant. Any suitable mechanism may be employed for throwing out the clutch. In the drawing, I have shown a worm 36, upon the shaft 16, and this worm engages a worm wheel 37, mounted upon a stud 38. Attached to the worm wheel is a single tooth pinion 39, adapted to engage a star wheel 40. On a stud 41, which supports the star wheel, is pivotally mounted a lever 42, having a cam surface 42ª, at its free end. This lever may be swung about the axis of the star wheel 40 and secured in any position of adjustment by a pin 43 in the lever, which is adapted to engage any one of a circular series of holes 44 in the star wheel. The clutch lever 45, for depressing the clutch member 18, is arranged so that it will be engaged by the cam lever 42 as the latter rotates with the star wheel, and this will move the clutch lever to disengage the clutch.

The operation of the invention is as follows:

The cam lever 42 is moved from the position shown in Fig. 1, to engage the clutch, and is set in a position on the star wheel which will cause it to throw out the clutch after a certain lapse of time, determined by experience to be the time required, at the higher temperature, to heat the can contents throughout to the normal processing temperature. The pockets in the can carrier being loaded with filled cans, I first admit live steam to the retort and to the engine independently for a short period of time. This is accomplished by turning the valve 27 so as to direct the steam through pipe 28 to the engine and by turning the valve 29 so as to direct steam from the pipe 31, through pipe 24, to the retort, and by opening the valves 22 and 23. As a certain amount of condensation takes place in the retort, some minutes will be required to heat the retort and raise the pressure therein to the point where the engine may be operated by the exhaust steam from the retort. A pressure gage 46 enables the operator to determine when the pressure within the retort is suitable for operating the engine, and a blow-off valve 47 is provided for relieving excess pressure.

After the pressure in the retort has risen sufficiently to operate the engine, the valves 27 and 29 are turned so as to direct the steam through the pipe 21 into the retort and from the retort through pipe 24 to the engine. The engine will then be operated by the steam pressure in the retort, and the governor which controls the admission of steam to the retort will maintain the speed of the engine practically constant. As the engine is now operating under load, a greater pressure will be required than if the engine were operating idly. Hence, the pressure and temperature within the retort will be at its highest. The lever 42 having been set opposite one or the other of the pin holes 44, according to the known time required to heat the can contents throughout to the processing temperature, as the speed is practically constant, this lever will, after a pre-determined lapse of time, engage the clutch lever and throw out the clutch thereby stopping the rotation of the can carrier. During this period, the temperature within the retort will have been above the normal processing temperature. After the can contents have been heated throughout to the processing temperature, no further advantage is to be gained by continuing the agitation of the cans and, also, it becomes necessary to reduce the temperature within the retort to approximately the processing temperature, in order to avoid injury to the can contents by heat. This reduction in temperature in the retort is accomplished automatically by the release of the clutch which throws the load off of the engine and allows the latter to run idly. When the load is thrown off, the governor automatically adjusts the throttle valve to cut down the flow of steam through the retort to the engine cylinder, and hence reduces the pressure and the temperature in the retort. By suitably adjusting the governor and its connections to the throttle valve, the normal processing temperature may be maintained in the retort as long as desired by allowing the engine to operate idly. The engine is allowed to operate idly as long as may be necessary to complete the processing after the can contents have been heated to the processing temperature. The engine will automatically adjust the throttle valve to compensate for the ordinary fluctuations in boiler pressure, thus serving the purpose of a pressure regulating mechanism.

After the goods have been processed, the valve 22 is closed to stop the engine and cut off steam from the retort, and the valve 29 is turned to connect the pipe 30 with pipe 24, and cold water is then admitted to the retort, to cool the cans, by opening the valve 34.

If desired, the drum and the inner peripheral wall of the retort, which form ends for the pockets, may be covered with a suitable non-metallic material to prevent abrasion of the cans.

What I claim is:

1. In a processing apparatus, a retort, means for agitating cans therein and for maintaining a temperature in the retort above the normal processing temperature at the commencement of the processing operation, and means for automatically reducing the temperature in the retort to the normal processing temperature after a predetermined lapse of time.

2. In a processing apparatus, a retort, means for agitating cans therein and for maintaining a relatively high temperature in the retort while the cans are being agitated, and means for automatically stopping the agitation of the cans and for reducing the temperature in the retort after a predetermined lapse of time.

3. In a processing apparatus, a retort, means for moving cans therein, a steam engine for operating said means, connections for admitting steam through the retort to the engine, a throttle valve controlling the admission of steam to the retort, and a governor operated by the engine for controlling said throttle valve.

4. In a processing apparatus, a retort, means for moving cans therein, a steam engine for operating said means, connections for admitting steam through the retort to the engine, a throttle valve controlling the admission of steam to the retort, a governor operated by the engine for controlling said throttle valve, and means for disconnecting the engine from the can-moving means after a pre-determined lapse of time.

5. In a processing apparatus, a retort, can agitating means therein, a motor for operating said means, and means for automatically disconnecting the motor from said agitating means after the latter has been operated for a pre-determined time.

In testimony whereof I affix my signature.

ALAN C. RICHARDSON.